Patented Sept. 13, 1938

2,130,194

UNITED STATES PATENT OFFICE 2,130,194

PRODUCTION OF ABRASIVE MATERIALS

Norman P. Robie, Niagara Falls, N. Y., assignor, by mesne assignments, to The Carborundum Company, Niagara Falls, N. Y., a corporation of Delaware No Drawing. Application July 28, 1936, Serial No. 93,048

10 Claims. (Cl. 51—280)

This invention relates to coated abrasive products and methods of manufacturing the same. More specifically, the invention is concerned with coated abrasive articles wherein there is employed a binder comprising heat hardened resin and a boric acid resin.

Heretofore the usual water dispersible adhesive used as a binder for flexible coated products has been high grade hide glue. The chief disadvantage of glue as a binder is its low resistance which makes it unsuitable for certain abrading operations, such as grinding steel welds with abrasive coated discs, where considerable heat is generated.

In United States Letters Patent No. 1,775,631, it is proposed to use synthetic resinous condensation products such as phenolic resins as binders for coated abrasive articles. These binders are much more heat resistant and have been found to be more suitable than glue for manufacturing abrasive coated discs which are subjected to high temperature abrading operations like the smoothing of steel welds. These binders are not self dispersible in water and organic solvents are used to thin the adhesive and to clean the coating machinery. The use of these organic solvents adds to the cost of the binder. Moreover, expensive precautions are necessary to alleviate the fire hazards caused by the use of these solvents.

I have discovered new and useful adhesive compositions which are self dispersible in water and which bake to tough, hard, heat resistant binders for attaching abrasive particles to backings. These compositions comprise heat hardenable resins in intimate admixture with various water soluble boric acid resins.

I may employ as heat hardenable resins the phenolic, alkyd, and urea types of condensation products. I prefer, however, to use, either a reactive heat hardenable liquid phenolic resin, or a solution of alkyd resin modified by reaction with phenol condensation products, since these resins bake quickly to tough hard films.

I may employ as water soluble boric acid resins the reaction products of polyhydric alcohols with polyvalent acids or mixtures of polyvalent acids always including some boric acid. For example, a resinous substance which is also soluble in water is obtained by the reaction of boric acid with glycerine. These water soluble resins are related to the alkyd resins having the aliphatic and aromatic organic acids replaced by inorganic acids. I have found the glycol and glycerol bori borate resins are very compatible with certain of the alkyd resins, possibly because of this relationship. I may also use an inorganic resin comprising a complex sodium boro phosphate such as is commonly sold under the trade name "Abopon."

My new compositions have several important features which make them particularly useful as binders for abrasives. These new compositions in general are dispersible in water and may therefore be used in place of glue in the usual abrasive paper making machinery used to apply glue adhesives. This does away with the added expense of maintaining special machinery for making coated abrasive products with resinous adhesives.

Another important feature of my invention is that much of the solvent expense and hazards are eliminated.

Further these new compositions are cheaper due to the cheapness of the boric acid resin component.

The following examples serve to illustrate, but are not intended to limit, the invention.

Example I 1125 lbs. of an oil modified phenol-reacted alkyd resin containing a comparatively small amount of drying oil fatty acid is dissolved in 1125 lbs. xylol.

375 lbs. lyceryl bori borate resin is heated on a water bath until fairly soft. The alkyd resin solution is then uniformly mixed in. This mixture may be thinned to any viscosity desirable by simply stirring in the requisite amount of water.

The above adhesive is applied to 130# cylinder paper at the rate of 2.3 lbs. per ream of 480 sheets 9" by 11". 80 grit fused alumina is uniformly distributed over this adhesive coating at the rate of 31.3 lbs. per ream. The abrasive coating is then sized by applying the same adhesive at the rate of 4.4 lbs. per ream. The coated paper is cured for 4½ hours at 250° F. to harden the adhesive. Very excellent abrasive paper is made according to this example which performs better than comparable abrasive paper made with high grade hide glue.

Example II

In place of the glycerol bori borate used in Example I, I may use a material which is sold under the trade name "Abopon" and which is described as a complex sodium boro phosphate. I may increase the amount of "Abopon" to equal the amount of solid alkyd resin. These compositions may be diluted with water to give uniform, stable, creamy adhesives which cure at from 1½ to 3 hours at 250° F. to tough adherent films.

*Example III*

75 pts. liquid heat reactive phenolic resin such as is commonly used for wetting abrasive in the manufacture of resinoid abrasive wheels is kneaded with 25 pts. glyceryl bori borate to form a water dispersible adhesive suitable for the manufacture of abrasive coated products. The adhesive may be hardened at 250° F.

My invention as described provides a cheaper adhesive easily dispersible in water which may be heat hardened into a tough film.

While I have described the invention by certain specific examples, various modifications may be made, without traversing the scope of the invention.

I claim:

1. An abrasive article comprising a backing and a layer of abrasive grains attached thereto by a binder comprising a heat hardened mixture of a synthetic resin and a water soluble resin comprising a condensation product of polyhydric alcohol and boric acid.

2. An abrasive article comprising a backing and a layer of abrasive grains attached thereto by a binder comprising a heat hardened mixture of an alkyd resin and a water soluble resin comprising a condensation product of polyhydric alcohol and boric acid.

3. An abrasive article comprising a backing and a layer of abrasive grains attached thereto by a binder comprising a heat hardened mixture of a phenolic resin and a water soluble resin comprising a condensation product of polyhydric alcohol and boric acid.

4. An abrasive article comprising a backing and a layer of abrasive grains attached thereto by a binder comprising a heat hardened mixture of an oxidized alkyd resin and a water soluble glyceryl bori borate resin.

5. An adhesive for attaching abrasive particles to a backing comprising a heat hardenable resin and a water soluble resin containing boric acid in combination.

6. An adhesive for attaching abrasive particles to a backing comprising a heat hardenable reactive phenolic resin and a water soluble resin containing boric acid in combination.

7. An adhesive for attaching abrasive particles to a backing comprising an oxidizable alkyd resin and a water soluble resin containing boric acid in combination.

8. An adhesive for attaching abrasive particles to a backing comprising a heat hardenable alkyd resin and a water soluble glyceryl bori borate resin.

9. An adhesive for attaching abrasive particles to a backing comprising a heat-hardenable alkyd resin and a water soluble resin containing boric acid in combination.

10. An adhesive for attaching abrasive particles to a backing comprising a heat-hardenable alkyd resin and a water soluble resin containing sodium boro phosphate.

NORMAN P. ROBIE.

---

CERTIFICATE OF CORRECTION.

Patent No. 2,130,194. September 13, 1938.

NORMAN P. ROBIE.

It is hereby certified that error appears in the printed specification of the above numbered patent requiring correction as follows: Page 1, second column, line 30, Example I, for "lyceryl" read glyceryl; and line 50, Example II, for "glycerol" read glyceryl; and that the said Letters Patent should be read with this correction therein that the same may conform to the record of the case in the Patent Office.

Signed and sealed this 15th day of November, A. D. 1938.

(Seal)

Henry Van Arsdale
Acting Commissioner of Patents.

positions may be diluted with water to give uniform, stable, creamy adhesives which cure at from 1½ to 3 hours at 250° F. to tough adherent films.

*Example III*

75 pts. liquid heat reactive phenolic resin such as is commonly used for wetting abrasive in the manufacture of resinoid abrasive wheels is kneaded with 25 pts. glyceryl bori borate to form a water dispersible adhesive suitable for the manufacture of abrasive coated products. The adhesive may be hardened at 250° F.

My invention as described provides a cheaper adhesive easily dispersible in water which may be heat hardened into a tough film.

While I have described the invention by certain specific examples, various modifications may be made, without traversing the scope of the invention.

I claim:

1. An abrasive article comprising a backing and a layer of abrasive grains attached thereto by a binder comprising a heat hardened mixture of a synthetic resin and a water soluble resin comprising a condensation product of polyhydric alcohol and boric acid.

2. An abrasive article comprising a backing and a layer of abrasive grains attached thereto by a binder comprising a heat hardened mixture of an alkyd resin and a water soluble resin comprising a condensation product of polyhydric alcohol and boric acid.

3. An abrasive article comprising a backing and a layer of abrasive grains attached thereto by a binder comprising a heat hardened mixture of a phenolic resin and a water soluble resin comprising a condensation product of polyhydric alcohol and boric acid.

4. An abrasive article comprising a backing and a layer of abrasive grains attached thereto by a binder comprising a heat hardened mixture of an oxidized alkyd resin and a water soluble glyceryl bori borate resin.

5. An adhesive for attaching abrasive particles to a backing comprising a heat hardenable resin and a water soluble resin containing boric acid in combination.

6. An adhesive for attaching abrasive particles to a backing comprising a heat hardenable reactive phenolic resin and a water soluble resin containing boric acid in combination.

7. An adhesive for attaching abrasive particles to a backing comprising an oxidizable alkyd resin and a water soluble resin containing boric acid in combination.

8. An adhesive for attaching abrasive particles to a backing comprising a heat hardenable alkyd resin and a water soluble glyceryl bori borate resin.

9. An adhesive for attaching abrasive particles to a backing comprising a heat-hardenable alkyd resin and a water soluble resin containing boric acid in combination.

10. An adhesive for attaching abrasive particles to a backing comprising a heat-hardenable alkyd resin and a water soluble resin containing sodium boro phosphate.

NORMAN P. ROBIE.

---

CERTIFICATE OF CORRECTION.

Patent No. 2,130,194. September 13, 1938.

NORMAN P. ROBIE.

It is hereby certified that error appears in the printed specification of the above numbered patent requiring correction as follows: Page 1, second column, line 30, Example I, for "lyceryl" read glyceryl; and line 50, Example II, for "glycerol" read glyceryl; and that the said Letters Patent should be read with this correction therein that the same may conform to the record of the case in the Patent Office.

Signed and sealed this 15th day of November, A. D. 1938.

(Seal)

Henry Van Arsdale
Acting Commissioner of Patents.